Jan. 13, 1953         L. B. WEYMOUTH         2,625,426
                          VISOR
                    Filed Oct. 18, 1946
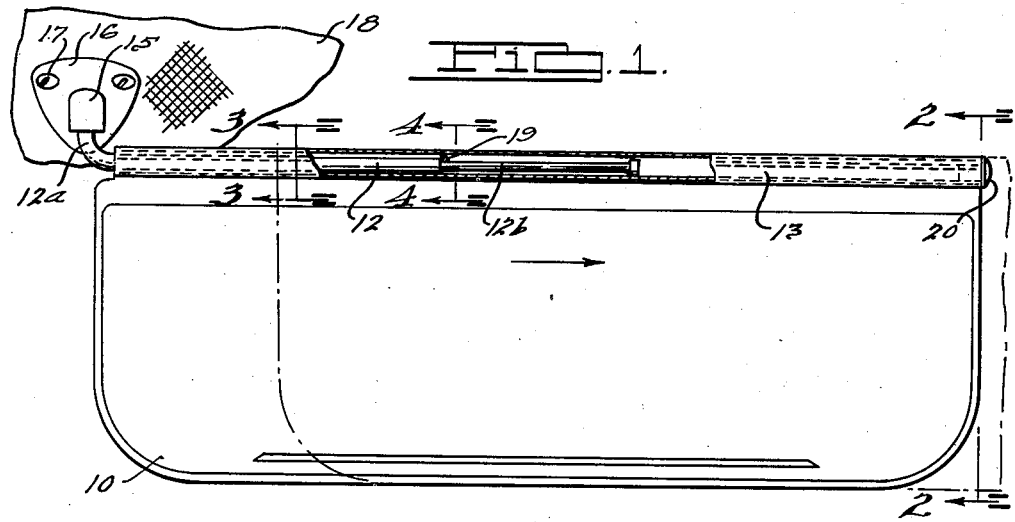
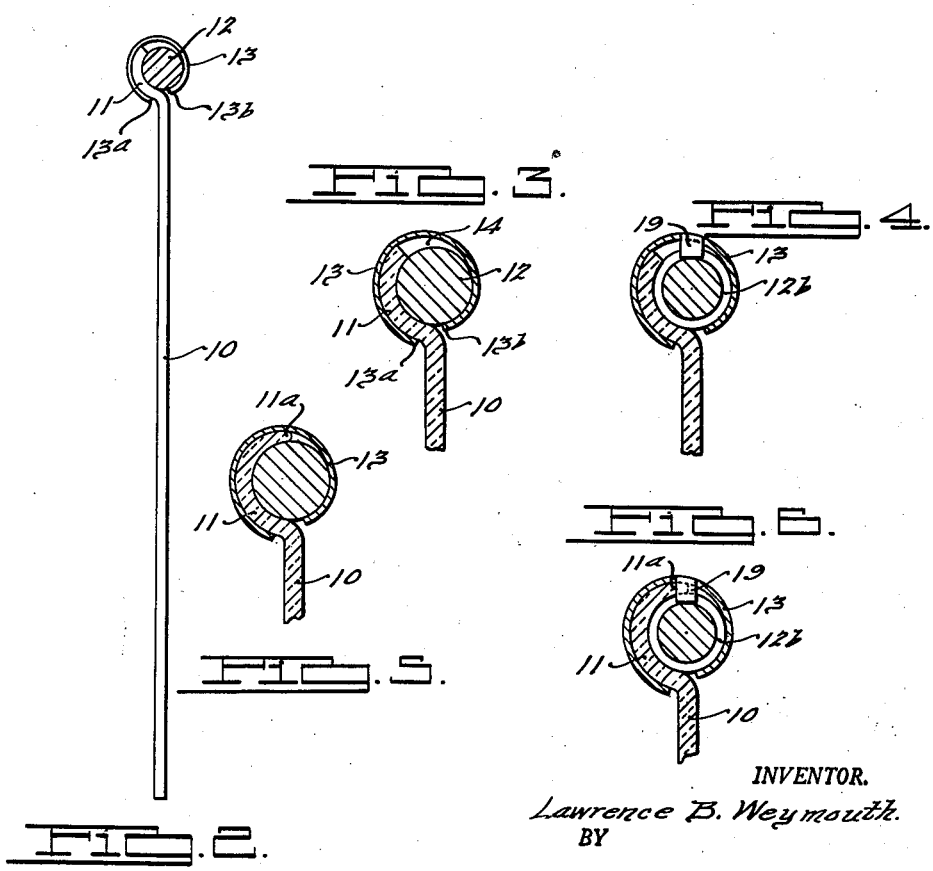
INVENTOR.
Lawrence B. Weymouth.
BY
Elmer Jamison Gray
ATTORNEY.

Patented Jan. 13, 1953

2,625,426

UNITED STATES PATENT OFFICE 2,625,426

VISOR

Lawrence B. Weymouth, Grosse Pointe Farms, Mich., assignor to Briggs Manufacturing Company, Detroit, Mich., a corporation of Michigan Application October 18, 1946, Serial No. 704,169

7 Claims. (Cl. 296—97)

This invention relates to glare shields or sun visors adapted to be mounted on the interior of automobile or other vehicle bodies above the windshields thereof for the purpose of shielding the front seat driver or passenger from the glare of the sun. The invention particularly relates to glare shields or sun visors in which the shield proper is adapted to be swung in a vertical direction upon a supporting shaft and is preferably formed by pressing or molding operations or the like from plastic or composition material.

An object of the invention is to provide a glare shield device in which the shield proper is mounted in improved manner upon a supporting shaft or rod to turn thereon while at the same time being frictionally held on the shaft in any angularly adjusted position.

A further object of the invention is to provide a glare shield structure in which the shield proper is formed of plastic or composition material and is rotatably held on a supporting shaft by means of an arcuate bearing portion along the edge of the shield and a split tubular spring embracing said bearing portion and the shaft and having a bearing upon a portion of the latter.

Still another object is to provide a shield device in which the shaft bearing portion along the edge of the shield proper may be molded, pressed or formed between dies, such bearing portion extending in an arc so as to have uniform frictional engagement with a portion of the shaft and being yieldingly held on the shaft by a longitudinally split tubular spring embracing said tubular portion and the shaft.

Other objects of this invention will appear in the following description and appended claims, reference being had to the accompanying drawings forming a part of this specification wherein like reference characters designate corresponding parts in the several views.

Fig. 1 is a side elevation, partly in section, illustrating a glare shield or sun visor constructed in accordance with one embodiment of the present invention.

Fig. 2 is an enlarged end view taken substantially through lines 2—2 of Fig. 1 looking in the direction of the arrows.

Fig. 3 is an enlarged section taken substantially through lines 3—3 of Fig. 1 looking in the direction of the arrows.

Fig. 4 is an enlarged section taken substantially through lines 4—4 of Fig. 1 looking in the direction of the arrows.

Figs. 5 and 6 are views similar, respectively, to Figs. 3 and 4 but illustrating slight modifications.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein I have illustrated, by way of example, certain embodiments of the present invention, the glare shield proper is indicated at 10 and is formed of suitable material to the desired dimensions in order adequately to shield the front seat driver or passenger from the glare of the sun during operation of the vehicle. The shield 10 is preferably pressed or molded from composition or plastic material between cooperating male and female die or mold members and during this operation is formed along the length of its upper edge with a longitudinally extending arcuate bearing portion 11. In pressing or molding the bearing portion 11 between suitable die or mold members I prefer to offset this bearing portion laterally so that the plane of the shield 10 will pass substantially through the center of curvature of the arcuate bearing portion 11. This bearing portion should extend in an arc such as to permit separation of the forming die or mold members. Ordinarily this arc would not exceed 180°. However, due to the natural spring-back of some types of plastic material this arc in some instances may extend up to 225°.

The arcuate bearing portion 11 along the upper edge of the shield 10 has uniform engagement with a portion of the outer annular surface of a supporting shaft or rod 12 which, in the present instance, is of a length substantially less than the length of the shield 10 and its bearing portion 11. The shield is clamped to the supporting shaft or rod 12 by means of a longitudinally split tubular spring 13 which extends substantially the full length of the shield and embraces both the bearing portion 11 and the shaft 12. In assembling the clamping spring 13 on the shield and shaft 12 the spring may be expanded and snapped over the bearing portion 11 and shaft or may be expanded sufficiently to permit it to be slid lengthwise over the ends of the bearing portion and shaft so as to occupy the position shown in the drawing. The gage of the metal forming the tubular spring 13 is selected so that the spring will have sufficient tension, when assembled, to hold the bearing portion 11 firmly in engagement with the shaft 12. When the spring clamping member 13 has been installed the edges 13a and 13b will be separated a distance, as illustrated in Figs. 3 and 4, to provide a longitudinal slot through which the shield 10 extends.

It will be noted that the arcuate bearing portion 11 of the shield has frictional engagement with a portion of the annular surface of the shaft 12 at one side thereof while the tubular clamping spring 13 has frictional engagement with the shaft at the opposite side thereof, and in the embodiment illustrated in Figs. 1 to 4 inclusive a space 14 remains between the shaft engaging portions of the shield and clamping member within which no engagement of the shaft occurs. It will be apparent from the foregoing construction that the shield 10 may be turned in a vertical direction on and relatively to the shaft 12 so as to adjust the angular position of the shield, and due to the yielding frictional engagement of the bearing portion 11 and clamping spring 13 the shield will be held in any of its adjusted positions.

In accordance with the present embodiments of the invention the shield 10 is adjustable longitudinally with respect to the shaft 12, this being accomplished by sliding the shield on the shaft between predetermined limits, such as those illustrated in full and dotted lines in Fig. 1. The limits of longitudinal adjustment of the shield on the shaft may be determined by providing the shaft 12 with a turndown or reduced portion 12b in its length and providing the clamping spring 13 with a suitable stop shiftable along the reduced portion of the shaft between the shoulders formed at opposite ends of this reduced portion. In the present instance the stop member on the clamping spring comprises an inwardly projecting lug or tongue 19 lanced out of the metal thereof and adapted to ride within and along the reduced portion 12b of the shaft. Engagement of this stop 19 with one or the other of the shoulders at the end of the reduced shaft portion 12b will limit the longitudinal adjustment of the shield upon the shaft.

The outer end of the tubular clamping spring 13 may be suitably closed as by means of a headed stud 20 having a threaded shank screwed into a tapped hole in the end of the shaft 12. The inner end of the shaft is supported in any suitable manner so as to permit the shield to be swung in a horizontal direction. In the present instance the inner end of the shaft terminates in a vertical crank portion 12a having a frictional bearing within a hollow boss 15 formed on a bracket plate 16 adapted to be secured by means of screws 17 to the windshield header 18 of the vehicle. It will be understood that any suitable friction bearing means may be provided for supporting the inner end of the shaft 12 so as to enable it to be adjusted angularly in a horizontal direction and, if desired, the shaft may be supported in the manner illustrated in application Serial No. 623,621.

The modified construction illustrated in Figs. 5 and 6 is the same as the construction above described with the exception that the bearing portion 11 of the shield 10 is extended a somewhat greater distance around the shaft 12, the outer edge of the bearing portion having a tapered extension 11a which fills the major portion of the space 14 shown in Figs. 5 and 6. A notch is formed in the extension 11a to receive the lug or stop member 19, thus providing an interlocking connection between the clamping spring 13 and the shield bearing portion 11, preventing any possibility of relative longitudinal movement thereof.

I claim:

1. A glare shield structure for a vehicle body comprising a supporting rod having a longitudinal portion round in cross-section, a glare shield having its upper edge portion laterally offset and arcuately formed in cross-section to fit partly around said longitudinal portion of the rod, and a longitudinally split tubular clamping member enclosing said rod and arcuately formed portion and effective to exert yielding pressure thereon to hold said arcuately formed portion of the shield in frictional engagement with the rod while permitting the shield to be swung about the axis thereof.

2. A glare shield structure for a vehicle body comprising a supporting rod having a longitudinal portion round in cross-section, a glare shield having its upper edge portion laterally offset and arcuately formed in cross-section to fit partly around said longitudinal portion of the rod, and a longitudinally split tubular clamping member enclosing said rod and arcuately formed portion and effective to exert yielding pressure thereon to hold said arcuately formed portion of the shield in frictional engagement with the rod while permitting the shield to be swung about the axis thereof, the edges of said clamping member being separated to lie at opposite sides of the shield.

3. A glare shield structure for a vehicle body comprising a supporting rod annular in cross-section, a glare shield having its upper edge portion arcuately formed in cross-section to receive one side of said rod in uniform engagement therewith, a longitudinally split spring member embracing the rod for clamping said shield portion to the rod and having a portion frictionally engaging the opposite side of the rod, said shield and spring member being turnable on the rod and also slidable longitudinally thereof.

4. A glare shield structure for a vehicle body comprising a supporting rod annular in cross-section, a glare shield having its upper edge portion arcuately formed in cross-section to receive one side of said rod in uniform engagement therewith, a longitudinally split spring member embracing the rod for clamping said shield portion to the rod and having a portion frictionally engaging the opposite side of the rod, said shield and spring member being turnable on the rod and the shield extending downwardly between and free of the separated edges of said spring member.

5. A glare shield structure for a vehicle body comprising a supporting rod annular in cross-section, a glare shield having its upper edge portion offset laterally of the plane of the shield and arcuately formed in cross-section to receive one side of said rod in uniform engagement therewith, a longitudinally split spring member embracing the rod for clamping said shield portion to the rod and having a portion frictionally engaging the opposite side of the rod, said shield and spring member being turnable on the rod and the shield extending downwardly between and free of the separated edges of said spring member.

6. In a mounting for an adjustable member having an arcuate portion, a supporting rod having a circumferential portion engaging said arcuate portion, and longitudinally split tubular spring means engaging said rod and arcuate portion for yieldably holding the same in their aforesaid engaged relation.

7. In a mounting for an adjustable member having a longitudinally extending arcuate portion, a supporting rod having a circumferential portion adjustably engaged with said arcuate portion, and means yieldingly maintaining said adjustable engagement including longitudinally split tubular spring means embracing said member and frictionally engaging said rod.

LAWRENCE B. WEYMOUTH.

REFERENCES CITED

The following references are of record in the file of this patent:

UNITED STATES PATENTS

| Number | Name | Date |
|---|---|---|
| 57,263 | Winter | Aug. 14, 1866 |
| 1,288,153 | Otte | Dec. 17, 1918 |
| 1,862,432 | Rose | June 7, 1932 |
| 2,496,129 | Moore | Jan. 31, 1950 |

FOREIGN PATENTS

| Number | Country | Date |
|---|---|---|
| 342,538 | Great Britain | Feb. 5, 1931 |
| 629,630 | France | Aug. 1, 1927 |